US009122962B2

(12) United States Patent
Teraue (10) Patent No.: US 9,122,962 B2
(45) Date of Patent: Sep. 1, 2015

(54) COLOR EVALUATION SYSTEM, METHOD AND STORAGE MEDIUM FOR EVALUATING COLOR REPRODUCIBILITY AND MEASURE PATCHES HAVING IDENTIFICATION AND COLOR SPACE CHARACTERISTICS

(71) Applicant: FUJIFILM Corporation, Tokyo (JP)

(72) Inventor: Eiji Teraue, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/942,806

(22) Filed: Jul. 16, 2013

(65) Prior Publication Data
US 2014/0043626 A1 Feb. 13, 2014

(30) Foreign Application Priority Data
Aug. 8, 2012 (JP) ................................. 2012-175517

(51) Int. Cl.
*G06K 15/02* (2006.01)
*H04N 1/60* (2006.01)

(52) U.S. Cl.
CPC ............ *G06K 15/027* (2013.01); *H04N 1/6033* (2013.01)

(58) Field of Classification Search
CPC .......... H04N 1/00005; H04N 1/00045; H04N 1/00222; H04N 1/6033; H04N 1/6055; H04N 1/6058; H04N 1/6077; G06K 15/027
See application file for complete search history.

(56) References Cited

U.S. PATENT DOCUMENTS

| 2005/0062753 | A1 | 3/2005 | Kitazawa |
| 2006/0126139 | A1* | 6/2006 | Tanaka .......................... 358/518 |
| 2006/0158672 | A1* | 7/2006 | Kondo ............................ 358/1.9 |
| 2006/0262360 | A1 | 11/2006 | Dalrymple et al. |
| 2010/0067025 | A1 | 3/2010 | Agehama |
| 2011/0176157 | A1* | 7/2011 | Katayama ...................... 358/1.9 |
| 2012/0050770 | A1* | 3/2012 | Katayama et al. ............. 358/1.9 |

FOREIGN PATENT DOCUMENTS

| EP | 1 206 122 A1 | 5/2002 |
| EP | 2348702 A2 | 7/2011 |
| JP | 2002-368979 A | 12/2002 |
| JP | 2005-277762 A | 10/2005 |
| JP | 2006-333471 A | 12/2006 |

OTHER PUBLICATIONS

Extended European Search Report for European Application No. 13175738.7, dated Oct. 16, 2013.
(Continued)

*Primary Examiner* — Benny Q Tieu
*Assistant Examiner* — Haris Sabah
(74) *Attorney, Agent, or Firm* — Birch, Stewart, Kolasch & Birch, LLP (57) ABSTRACT

Print data are generated so as to include an evaluation patch group, which has at least one evaluation color patch, the color of which was determined depending on the type of input color space characteristics used in a color conversion process on content data representing print content, and an identification color patch having a color inherent to the type of input color space characteristics. The type of input color space characteristics is identified based on a colorimetric value of the identification color patch on a print. Judgment conditions for color reproducibility are acquired depending on the type of input color space characteristics.

9 Claims, 8 Drawing Sheets

(56) References Cited

OTHER PUBLICATIONS

European Office Action issued in European Application No. 13 175 738.7 on Apr. 29, 2015.

ISO 12647-2 of 2004, "Graphic Technology—Process Control for the Production of Half-Tone Colour Separations, Proof and Production Prints—Part 2: Offset Litographic Processes." First Edition Dec. 15, 2004; Amendment 1: Apr. 15, 2007. (10 pages).

ISO 12647-2 of 2004, "Graphic Technology—Process Control for the Production of Half-Tone Colour Separations, Proof and Production Prints—Part 2: Offset Litographic Processes." Second Edition Nov. 15, 2004. (25 pages).

* cited by examiner

| COLOR PATCH | COLOR | L* | a* | b* |
|---|---|---|---|---|
| 34a | Paper | 93 | 0 | −3 |
| 34b | K | 16 | 0 | 0 |
| 34c | C | 54 | −36 | −49 |
| 34d | M | 46 | 72 | −5 |
| 34e | Y | 88 | −6 | 90 |
| 34f | M+Y | 47 | 66 | 50 |
| 34g | C+Y | 49 | −66 | 33 |
| 34h | C+M | 20 | 25 | −48 |
| 34i | C+M+Y | 18 | 3 | 0 |

COLOR REPRODUCIBILITY JUDGMENT SCREEN

Lab

| PATCH | TARGET VALUE | | | ALLOWABLE ERROR | | | MEASURED VALUE | | |
|---|---|---|---|---|---|---|---|---|---|
| | L* | a* | b* | ΔE | ΔH | | ΔE | | ΔH |
| Cyan | 55.00 | −37.00 | −50.00 | 5 | 2.50 | | | | |
| Magenta | 48.00 | 74.00 | −3.00 | 5 | 2.50 | | | | |
| Yellow | 89.00 | −5.00 | 93.00 | 5 | 2.50 | | | | |
| Black | 16.00 | 0.00 | 0.00 | 5 | | | | | |
| Red | 47.00 | 68.00 | 48.00 | 10 | | | | | |
| Green | 50.00 | −65.00 | 27.00 | 10 | | | | | |
| Blue | 24.00 | 22.00 | −46.00 | 10 | | | | | |
| CMY 100% | 23.09 | 0.17 | −0.24 | 2 | | | | | |
| CMY 75% | 80.50 | 0.99 | −2.87 | 2 | | | | | |
| CMY 50% | 61.56 | 0.69 | −1.51 | 2 | | | | | |
| CMY 25% | 41.93 | 0.73 | 0.13 | 2 | | | | | |

TARGET: Coated FOGRA 39

CANCEL  SAVE

FIG. 8

COLOR EVALUATION SYSTEM, METHOD AND STORAGE MEDIUM FOR EVALUATING COLOR REPRODUCIBILITY AND MEASURE PATCHES HAVING IDENTIFICATION AND COLOR SPACE CHARACTERISTICS

CROSS-REFERENCE TO RELATED APPLICATION

This application is based upon and claims the benefit of priority from Japanese Patent Application No. 2012-175517 filed on Aug. 8, 2012, the contents of which are incorporated herein by reference.

BACKGROUND OF THE INVENTION

1. Field of the Invention

The present invention relates to a print color evaluating system, a print color evaluating method, and a storage medium storing a program for generating print data including at least one item of print content, producing a print based on the print data, and evaluating color reproducibility of the print based on colorimetric values obtained by colorimetrically measuring the print.

2. Description of the Related Art

Heretofore, offset presses have been managed according to domestic and international standards to carry out quality control (QC) thereon. For example, ISO (International Standard Organization) 12647-2 sets forth allowable errors, tone curves, etc., as items for management and evaluation of color accuracy.

Recently, the importance of color accuracy management according to standards such as ISO has also been acknowledged with respect to proofs produced by printing systems for directly producing prints from digital data (digital printing systems).

Japanese Laid-Open Patent Publication No. 2002-368979 discloses an apparatus and a program for generating print data representing a combination of print content processed by a color conversion process and color patches for color evaluation.

Japanese Laid-Open Patent Publication No. 2005-277762 discloses a color management system for managing, on a server device, color profiles (inherent information of color charts) of image forming apparatus installed at respective sites, comparing color profiles with standards, and indicating the result of such a color comparison.

SUMMARY OF THE INVENTION

In a case where attempts are made to reach agreement concerning colors between print producers, designers, and printers, it often is customary to present, or have presented, a combination of content data defined in a device-dependent color space including C, M, Y, K, and types of standards linked to the content data. In order to confirm color reproducibility strictly, color patches for target colors suitable for the type of color space characteristics of an input side (hereinafter referred to as "input color space characteristics") may be printed and colorimetrically measured together with print content. Such "color space characteristics" refer to characteristics representing a correspondence between a device-dependent color space including C, M, Y, K, and a device-independent color space including L*, a*, b*.

Different standards have different judgment conditions due to different requisite specifications of color reproducibility depending on how the prints are used. For example, judgment conditions include the number of color patches, target values, allowable errors, a calculating method, and evaluation items. An operator is required to identify the type of input color space characteristics depending on color patches by visually recognizing identification information added to a print. The operator then inputs the identified type through an operation terminal.

Although the color management system disclosed in Japanese Laid-Open Patent Publication No. 2005-277762 can automatize part of the process of judging color reproducibility, the publication indicates no specific means for identifying the type of input color space characteristics. It has been tedious and time-consuming for an operator to identify the type of input color space characteristics.

It is an object of the present invention to provide a print color evaluating system, a print color evaluating method, and a storage medium, which are capable of significantly increasing the efficiency at which judgments are made concerning types of input color space characteristics.

According to the present invention, there is provided a print color evaluating system comprising an image processor that generates print data including at least one item of print content, a printing apparatus that produces a print based on the print data supplied from the image processor, a colorimeter that colorimetrically measures the print produced by the printing apparatus, and a color evaluating apparatus that evaluates color reproducibility of the print based on colorimetric values of the print produced by the colorimeter, wherein the image processor generates the print data so as to include an evaluation patch group, which has at least one evaluation color patch, a color of which was determined depending on a type of input color space characteristics used in a color conversion process on content data representing the print content, and an identification color patch having a color inherent to the type of input color space characteristics, and wherein the color evaluating apparatus comprises a judgment condition acquirer, which identifies the type of input color space characteristics based on a colorimetric value produced by the colorimeter of the identification color patch on the print, and acquires judgment conditions for the color reproducibility depending on the type of input color space characteristics, and a judgment section that judges colorimetric values of the evaluation patch group on the print, the colorimetric values being produced by the colorimeter, according to the judgment conditions acquired by the judgment condition acquirer, to thereby produce a color reproducibility judgment result.

As described above, the print color evaluating system includes the image processor that generates print data including an evaluation patch group, which has at least one evaluation color patch, the color of which was determined depending on the type of input color space characteristics used in a color conversion process on content data representing the print content, and an identification color patch having a color inherent to the type of input color space characteristics. The color evaluating apparatus comprises the judgment condition acquirer, which identifies the type of input color space characteristics based on a colorimetric value produced by the colorimeter of the identification color patch on the print, and acquires judgment conditions for color reproducibility depending on the type of input color space characteristics. Since the identification color patch is colorimetrically measured by the colorimeter that is used to colorimetrically measure the evaluation patch group, judgment conditions can automatically be acquired based on the obtained colorimetric values depending on the type of input color space characteristics. Thus, the efficiency with which color reproducibility of the print is judged can be increased significantly.

The color evaluating apparatus preferably further comprises a display unit that displays visible information concerning the judgment conditions acquired by the judgment condition acquirer, depending on colorimetric measurements taken on the identification color patch by the colorimeter. Therefore, the user can easily grasp on the display unit the judgment conditions for color reproducibility of the print to be evaluated.

The color evaluating apparatus preferably displays, as visible information on the display unit, target values and allowable errors for respective evaluation color patches.

The color evaluating apparatus preferably displays on the display unit a name of the input color space characteristics, the type of which has been identified.

According to the present invention, there is also provided a print color evaluating method carried out using an image processor that generates print data including at least one item of print content, a printing apparatus that produces a print based on the print data supplied from the image processor, a colorimeter that colorimetrically measures the print produced by the printing apparatus, and a color evaluating apparatus that evaluates color reproducibility of the print based on colorimetric values of the print produced by the colorimeter, the print color evaluating method comprising the steps of the image processor generating the print data including an evaluation patch group, which has at least one evaluation color patch, a color of which was determined depending on a type of input color space characteristics used in a color conversion process on content data representing the print content, and an identification color patch having a color inherent to the type of input color space characteristics, the color evaluating apparatus identifying the type of input color space characteristics based on a colorimetric value produced by the colorimeter of the identification color patch on the print, and acquiring judgment conditions for the color reproducibility depending on the type of input color space characteristics, and the color evaluating apparatus judging colorimetric values of the evaluation patch group on the print, the colorimetric values being produced by the colorimeter, according to the acquired judgment conditions, to thereby produce a color reproducibility judgment result.

The print color evaluating method preferably further comprises the step of displaying visible information concerning the acquired judgment conditions, depending on colorimetric measurements taken on the identification color patch by the colorimeter.

The step of displaying preferably comprises the step of displaying, as the visible information, target values and allowable errors for respective evaluation color patches.

The step of displaying preferably comprises the step of displaying a name of the input color space characteristics, the type of which has been identified.

According to the present invention, there further is provided a non-transitory storage medium storing a program for evaluating color reproducibility of a print including at least one item of print content, based on colorimetric values produced by colorimetrically measuring the print, the program enabling a computer to perform the steps of generating the print data including an evaluation patch group, which has at least one evaluation color patch, a color of which was determined depending on a type of input color space characteristics used in a color conversion process on content data representing the print content, and an identification color patch having a color inherent to the type of input color space characteristics, identifying the type of input color space characteristics based on a colorimetric value produced by the colorimeter of the identification color patch on the print, and acquiring judgment conditions for the color reproducibility depending on the type of input color space characteristics, and judging colorimetric values of the evaluation patch group on the print, the colorimetric values being produced by the colorimeter, according to the acquired judgment conditions, to thereby produce a color reproducibility judgment result.

With the print color evaluating system, the print color evaluating method, and the storage medium according to the present invention, print data are generated including an evaluation patch group, which has at least one evaluation color patch, the color of which was determined depending on the type of input color space characteristics used in a color conversion process on content data representing print content, and an identification color patch having a color inherent to the type of input color space characteristics. The type of input color space characteristics are identified based on a colorimetric value produced by the colorimeter of the identification color patch on the print, and judgment conditions for color reproducibility are acquired depending on the type of input color space characteristics. Since the identification color patch is colorimetrically measured by the colorimeter, which is used to colorimetrically measure the evaluation patch group, judgment conditions can automatically be acquired from the obtained colorimetric values depending on the type of input color space characteristics. Thus, color reproducibility of the print can be judged with significantly increased efficiency.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A print color evaluating method according to a preferred embodiment of the present invention, in relation to a print color evaluating system and a storage medium that stores a program for carrying out the print color evaluating method, will be described in detail below with reference to the accompanying drawings.

[Configuration of Print Color Evaluating System 10]

Figure 1:
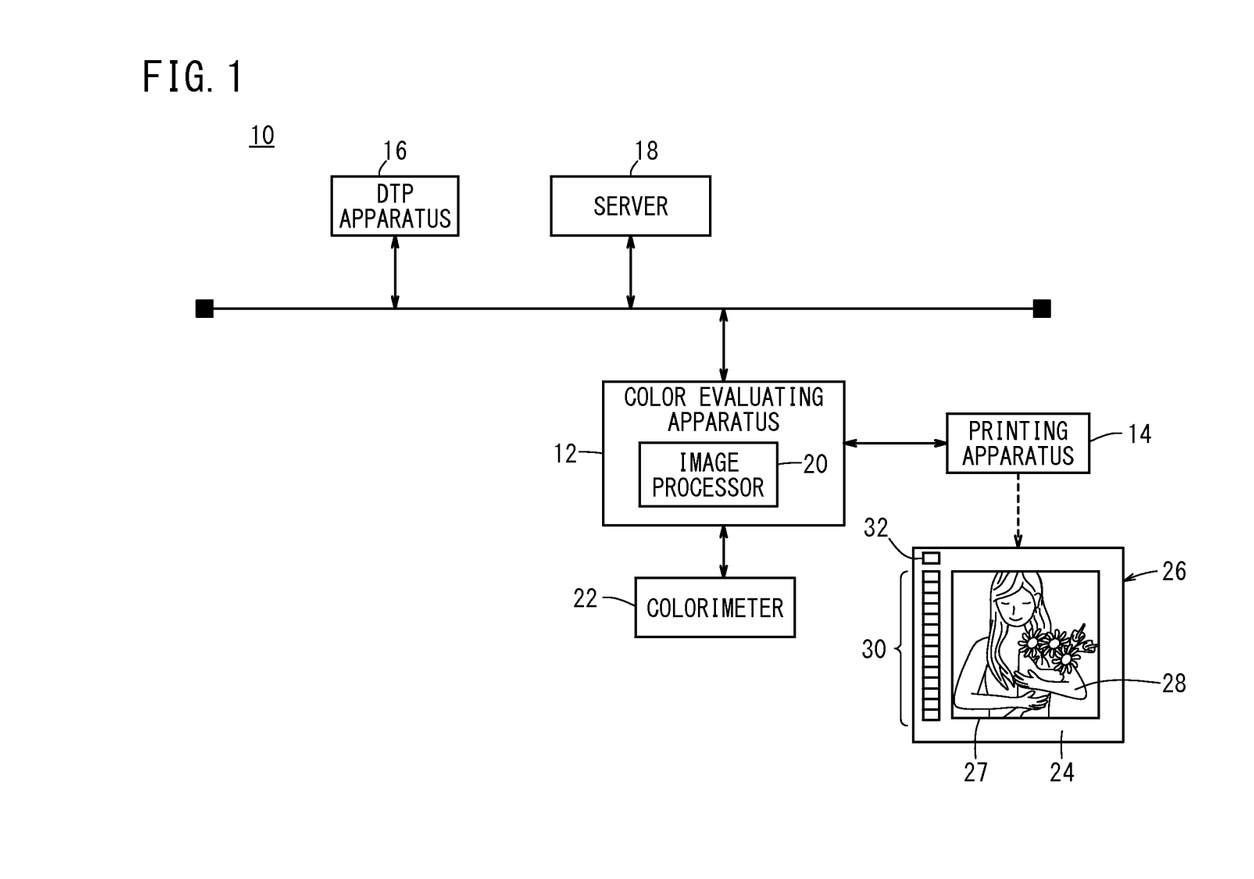
FIG. 1 is a block diagram of a print color evaluating system according to an embodiment of the present invention.

FIG. 1 is a block diagram of a print color evaluating system 10 according to an embodiment of the present invention.

As shown in FIG. 1, the print color evaluating system 10 includes a color evaluating apparatus 12, a printing apparatus 14, a DTP (DeskTop Publishing) apparatus 16, and a server 18. The color evaluating apparatus 12, the DTP apparatus 16, and the server 18 are connected electrically to each other by a wired or wireless link.

The color evaluating apparatus 12 has an image processor 20 (image processing means, see FIG. 3) to be described later, and comprises a computer for converting various data, e.g., page description data input from an external apparatus, into print data that are capable of being printed by the printing apparatus 14. The print data comprise image data defined in a device-dependent color space (hereinafter referred to as "device-dependent data"), which represent raster-format data, such as TIFF data, bitmap data, RAW data, or the like, having color channels in four colors of C, M, Y, K, or three colors of R, G, B.

The color evaluating apparatus 12 sends generated print data to the printing apparatus 14. The print data sent from the color evaluating apparatus 12 to the printing apparatus 14 may have a unique data format with a desired header added thereto.

Figure 3:
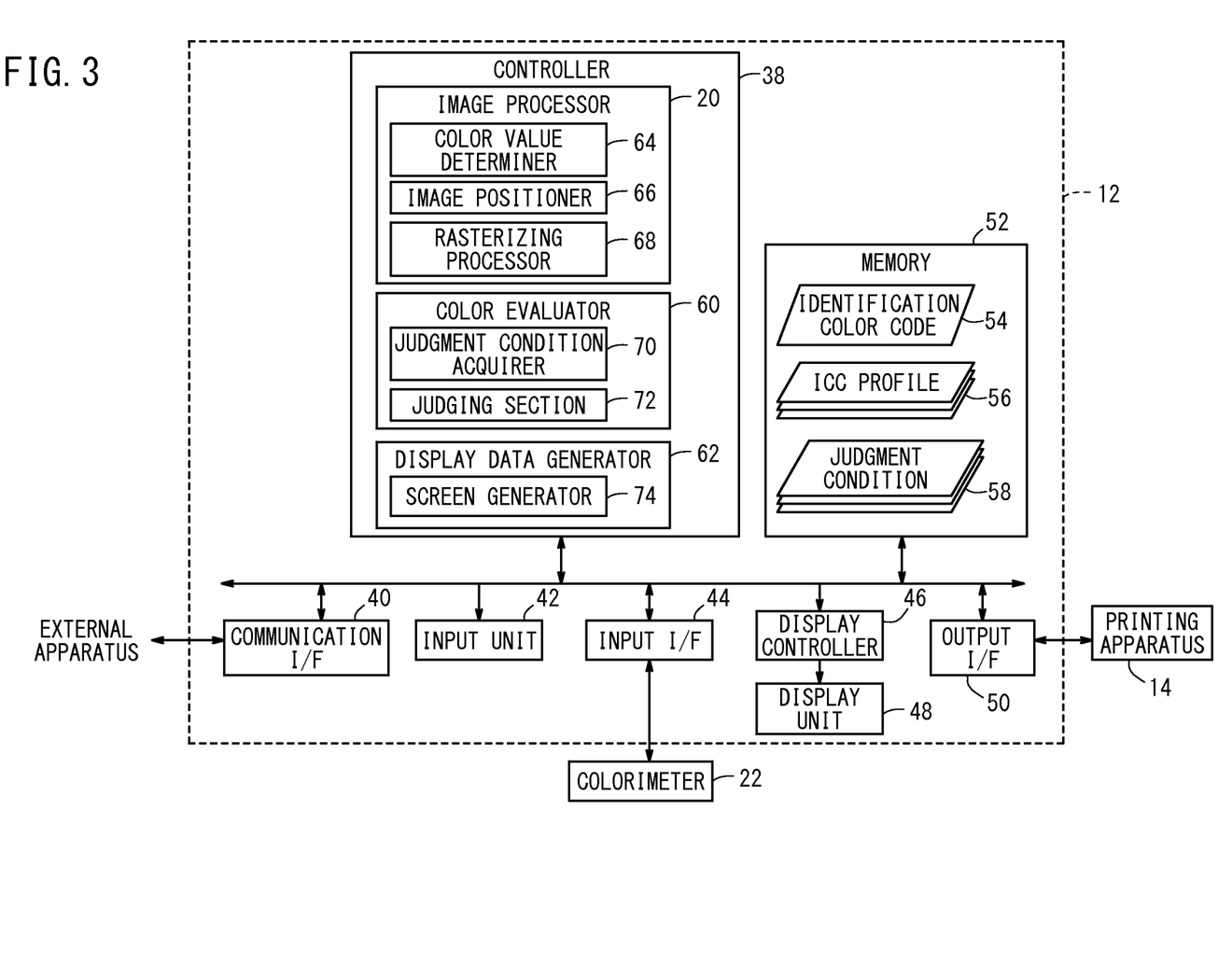
FIG. 3 is an electric block diagram of a color evaluating apparatus shown in FIG. 1.

A colorimeter 22 for measuring color values of an object to be measured is connected to the color evaluating apparatus 12 through an input I/F 44 (see FIG. 3). The color values include not only tristimulus values X, Y, Z, coordinate values $L^*$, $a^*$, $b^*$ of a uniform color space, or the like, but also characteristics of optical physical values determined with respect to wavelengths, e.g., a spectral radiation distribution, a spectral sensitivity distribution, a spectral reflectance, or a spectral transmittance. Color values acquired by the colorimeter 22 will hereinafter also be referred to as "colorimetric values".

The printing apparatus 14 is connected electrically to the color evaluating apparatus 12 through a serial interface such as a USB (Universal Serial Bus) cable, an IEEE1394 cable, an Ethernet (registered trademark) cable, a wireless network, or the like, or through a parallel interface such as a Centronics cable.

The printing apparatus 14 is an apparatus for forming an image on a medium (output medium) 24 in order to produce a print 26. The printing apparatus 14 may comprise a proofer for offset printing or a digital printer for direct printing. The proofer may comprise a DDCP (Direct Digital Color Proofer), which is equivalent to an offset press in terms of printing capabilities, an ink jet color proofer, a low-resolution color laser printer (electrophotographic printer), an ink jet printer, or the like. The digital printer may comprise an ink jet color proofer, a low-resolution color laser printer (electrophotographic printer), or the like.

The medium 24 has a base, which may comprise a paper medium such as synthetic paper, thick paper, aluminum-evaporated paper, or the like, a resin medium such as vinyl chloride, PET (polyethylene terephthalate), or the like, or tarpaulin paper, etc. The print 26 that is produced by the printing apparatus 14 is made up at least from print content 28 disposed in a finished area 27, together with an evaluation patch group 30 and an identification color patch 32, which are disposed in a crop area.

The DTP apparatus 16 enables editing of data comprising material (content) made up of characters, figures, pictures, photos, etc. The DTP apparatus 16 generates electronic manuscripts in a page description language (hereinafter referred to as "PDL") by laying out material data on each page. PDL refers to a language, which is descriptive of image information including format information, position information, color information (including density information), etc., of characters, figures, etc., in a "page" that serves as an output unit for printing, displaying, or the like.

The server 18 is an apparatus for managing data such as job tickets descriptive of various specifications concerning print jobs, e.g., JDF (Job Definition Format) files, target profiles, device profiles suitable for a combination of the printing apparatus 14 and the medium 24, or color sample data. The server 18 may manage a judgment result (to be described later), which is determined by the color evaluating apparatus 12 based on color reproducibility.

Figure 2A:
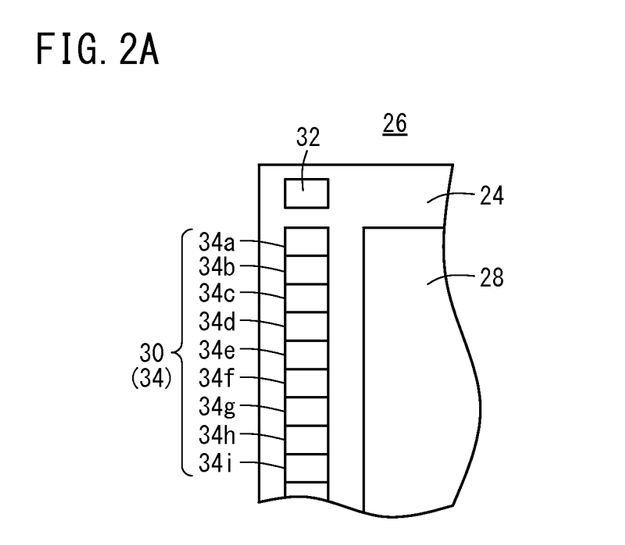
FIG. 2A is an enlarged fragmentary view of a print shown in FIG. 1.

FIG. 2A is an enlarged fragmentary view of the print 26 shown in FIG. 1.

As shown in FIG. 2A, an image representing the print content 28 is disposed centrally on the medium 24. It is assumed that such print content 28 is formed on the medium 24 after the medium 24 has been processed by the image processor 20 according to a color conversion process (see FIGS. 1 and 2).

An identification color patch 32 is disposed in the upper left corner of the medium 24. The identification color patch 32 has a color inherent to the type of input color space characteristics, for example, according to ISO 12647-2.

The evaluation patch group 30 (also referred to as a "control strip"), which has a plurality of color patches, is disposed on a left end portion of the medium 24. In FIG. 2A, the evaluation patch group 30 has nine evaluation color patches 34a through 34i, which are essentially identical in shape to each other. The evaluation color patches 34a through 34i are arrayed, without gaps therebetween, vertically along a direction in which the medium 24 is delivered from the printing apparatus 14. The evaluation color patches 34a through 34i will simply be referred to as "evaluation color patches 34" if it is not necessary for the evaluation color patches to be distinguished from each other.

Figure 2B:
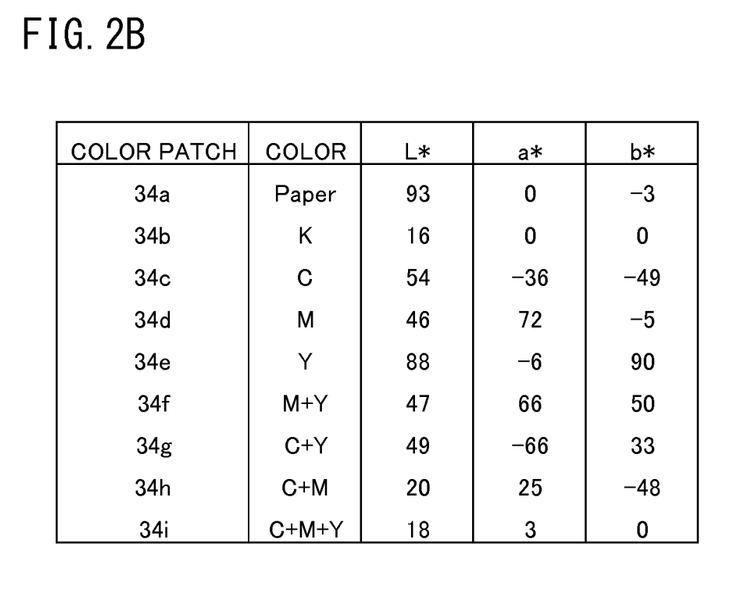
FIG. 2B is a diagram showing an example of determined color values of a group of patches shown in FIG. 2A.

FIG. 2B is a diagram showing an example of color values included in the evaluation color patches 34a through 34i shown in FIG. 2A. FIG. 2B shows reference values prescribed according to ISO 12647-2. For example, the evaluation color patch 34a includes the color values $L^*=93$, $a^*=0$, $b^*=-3$ for the color of an unprinted area (Paper), and the evaluation color patch 34f includes the color values $L^*=47$, $a^*=66$, $b^*=50$ for secondary colors of M, Y (M+Y).

Color values, which are not dependent on input and output apparatus that are defined in a device-independent color space, preferably are used as reference values. More specifically, such color values are defined in a color system such as HSV (Hue-Saturation-Value), HLS (Hue-Lightness-Saturation), CIELAB, CIELUV, XYZ, or the like.

FIG. 3 is an electric block diagram of the color evaluating apparatus 12 shown in FIG. 1. As shown in FIG. 3, the color evaluating apparatus 12 includes a controller 38, a communication I/F 40, an input unit 42, an input I/F 44, a display controller 46, a display unit 48, an output I/F 50, and a memory 52 (storage medium).

The communication I/F 40 is an interface for sending electric signals to and receiving electric signals from various external apparatus. For example, the communication I/F 40 can acquire various items of information such as proof data, platemaking data, ICC (International Color Consortium) profiles 56, judgment conditions 58, etc., which are managed and saved in the server 18 (see FIG. 1).

The input unit 42 comprises various input devices including a mouse, a trackball, a keyboard, etc. The input function of the input unit 42 and the display function of the display unit 48 are combined together into a user interface.

The input I/F 44 is an interface for receiving electric signals representing colorimetric data. The color evaluating apparatus 12 can acquire colorimetric data from the colorimeter 22 through the input I/F 44.

The display controller 46 comprises a control circuit for controlling the display unit 48 under the control of the controller 38. More specifically, in a case where the display controller 46 outputs a display control signal via a non-illustrated I/F to the display unit 48, the display unit 48 is energized to display various images including a window W (see FIGS. 6 and 7).

The output I/F 50 is an interface for sending electric signals representing print data. The printing apparatus 14 can produce a desired print 26 on a medium 24 based on print data sent from the color evaluating apparatus 12 via the output I/F 50.

The memory 52 stores programs and data that are required for the controller 38 to control various components. In FIG. 3, the memory 52 stores therein an identification color code 54 representing a correspondence between types of color space characteristics and color values of the identification color patch 32, a plurality of ICC profiles 56, and a plurality of judgment conditions 58. The memory 52 may comprise a computer readable non-transitory storage medium such as a nonvolatile memory, a hard disk, or the like.

The controller 38 comprises a processor such as a CPU (Central Processing Unit). The controller 38 reads and executes programs stored in the memory 52 in order to carry out functions of the image processor 20 (see FIG. 1), a color evaluator 60, and a display data generator 62.

The image processor 20 generates print data based on which the print 26 is produced (see FIGS. 1 and 2A). More specifically, the image processor 20 includes a color value determiner 64 for determining color values of the evaluation patch group 30 and the identification color patch 32, an image positioner 66 for positioning various images in given image areas, and a rasterizing processor 68 for rasterizing PDL-format data in order to generate raster-format print data.

The color evaluator 60 includes a judgment condition acquirer 70 for acquiring judgment conditions depending on types of input color space characteristics, and a judgment section 72 for judging colorimetric values of the evaluation patch group 30 according to the judgment conditions, so as to produce a color reproducibility judgment result.

The display data generator 62 includes a screen generator 74 for generating a judgment screen 80 (see FIGS. 6 and 7) for visually presenting colorimetric values, judgment results, etc.

The above-described programs may be recorded in a computer-readable storage medium. The programs recorded in the storage medium may be read and executed by a computer system. The computer system includes an OS and hardware such as a CPU and peripheral devices. The computer-readable storage medium comprises a portable medium such as a flexible disk, a magnetooptical disk, a ROM, a CD-ROM, or the like, or a storage medium such as a hard disk or the like incorporated in the computer system. The storage medium may also include a medium for dynamically holding programs for a short period of time, such as a communication line for transmitting programs via a network such as the Internet or the like, or a communication channel such as a telephone line, or a memory for holding programs for a certain period of time such as a volatile memory in a computer system that serves as a server or a client in a network environment.

[Operations of Print Color Evaluating System 10]

The print color evaluating system 10 according to the present embodiment is configured as described above. First and second modes of operation of the print color evaluating system 10 will be described below primarily with reference to FIGS. 3 through 7. The first mode of operation represents a mode for producing a print 26 with an evaluation patch group 30 and an identification color patch 32 (see FIG. 2A) added thereto. The second mode of operation represents a mode for judging color reproducibility of a print 26.

Figure 4:
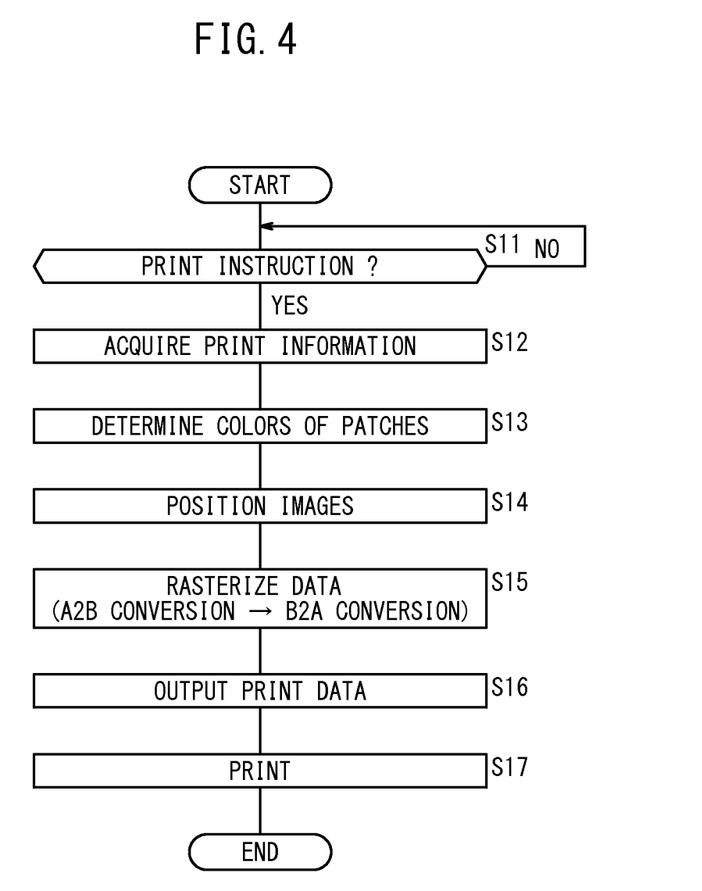
FIG. 4 is a first flowchart of an operation sequence performed by the print color evaluating system shown in FIG. 1.

The first mode of operation will be described below with reference to a first flowchart, as shown in FIG. 4. In step S11 of FIG. 4, the color evaluating apparatus 12 judges whether or not a print instruction has been received. If the color evaluating apparatus 12 judges that a print instruction has not been received (step S11: NO), then the control remains at step S11. If the color evaluating apparatus 12 judges that a print instruction has been received (step S11: YES), then control proceeds to step S12.

In step S12, the color evaluating apparatus 12 acquires information of a print 26 to be produced (hereinafter referred to as "print information") from the server 18 through the communication I/F 40. Examples of print information include data representing print content 28 (hereinafter referred to as "content data"), a job ticket including imposition information, an ICC profile 56, etc. The controller 38 stores the acquired information in the memory 52.

In step S13, the color value determiner 64 determines color values of respective color patches. More specifically, the color value determiner 64 reads the print information, the identification color code 54, and the judgment conditions 58 stored in the memory 52. Then, the color value determiner 64 identifies the type of color space characteristics to be used in a color conversion process performed on the content data, based on the print information. The "color space characteristics" refer to characteristics representative of a correspondence between a device-dependent color space and a device-independent color space.

The color conversion process implements a color conversion from a device-dependent color space to a device-independent color space, e.g., a color conversion representing a succession of an "A2B conversion" depending on color space characteristics of an input side (hereinafter referred to as "input color space characteristics"), and a "B2A conversion" depending on color space characteristics of an output side (hereinafter referred to as "output color space characteristics").

Standardized color space characteristics include, for example, FOGRA (Fogra Graphic Technology Research Association), SWOP (Specifications Web Offset Printing), GRACoL (General Requirements for Applications in Commercial Offset Printing), JapanColor, JPMA color (magazine advertisement standards), etc. Alternatively, rather than the above standards, other uniquely defined color space characteristics may be selected.

The color value determiner 64 determines a color value depending on the identified type of input color space characteristics, as a color value of the identification color patch 32 based on the identification color code 54. For example, the color value determiner 64 may determine a color value of the identification color patch 32 as red for FOGRA, green for GRACoL, and blue for JapanColor. Content (i.e., correspondence between color values) of the identification color code 54 may be variably provided by a client apparatus.

The color value determiner 64 also determines target values for color patches from among the judgment conditions 58, depending on the identified type of input color space characteristics, as color values of the evaluation color patches 34.

In step S14, the image positioner 66 positions various images to be printed within given image areas. More specifically, the image positioner 66 positions at least one item of print content 28, an evaluation patch group 30, and an identification color patch 32 in respective positions on the medium 24. The evaluation patch group 30 and the identification color patch 32 include respective pixel values corresponding to the color values determined in step S13.

In step S15, the rasterizing processor 68 rasterizes the device-dependent data (e.g., C, M, Y, K) generated in step S14. More specifically, the rasterizing processor 68 performs a first color conversion process (A2B conversion) on the device-dependent data depending on the input color space characteristics, thereby producing device-independent data (e.g., L*, a*, b*). Thereafter, the rasterizing processor 68 performs a second color conversion process (B2A conversion) on the device-independent data depending on the output color space characteristics, thereby producing device-dependent data (e.g., C, M, Y, K). Then, the rasterizing processor 68 converts the PDL-format device-dependent data into raster-format print data (e.g., 1-bit TIFF data).

In the above procedure, target values for the color patches are given as device-dependent data (solid colors of R, G, B, C, M, Y, K). However, target values for the color patches may also be given as device-independent data (e.g., L*, a*, b*). According to such an alternative, after the first color conversion process (A2B conversion) is performed, the rasterizing processor 68 adds at least one of the evaluation patch group 30 and the identification color patch 32, and then performs the second color conversion process (B2A conversion), thereby reproducing colors in the vicinity of the target values. Such an approach is effective if the number of evaluation color patches 34 is large.

In step S16, the color evaluating apparatus 12 outputs the print data generated in step S15 through the output I/F 50. The printing apparatus 14 acquires the print data from the color evaluating apparatus 12.

In step S17, the printing apparatus 14 produces a print 26 based on the acquired print data. More specifically, based on the acquired print data, the printing apparatus 14 produces the print content 28, the evaluation patch group 30, and the identification color patch 32 on a single medium 24.

In this manner, the first mode of operation for producing the print 26 with various color patches added thereto is completed. The operator as a user visually confirms the print content 28 in order to judge whether or not the color reproducibility thereof is acceptable.

If the operator wishes to confirm color reproducibility in a strict manner, the operator may refer to colorimetric values of the evaluation patch group 30. Judgment conditions of various standards differ from each other due to different requisite specifications of color reproducibility depending on how the print 26 is used. Therefore, it is necessary to identify the type of input color space characteristics depending on the evaluation patch group 30, and thereafter to enter the identified type through the operation terminal, i.e., the color evaluating apparatus 12.

Next, the second mode of operation will be described below with reference to the second flowchart shown in FIG. 5, and the judgment screens shown in FIGS. 6 and 7.

Figure 5:
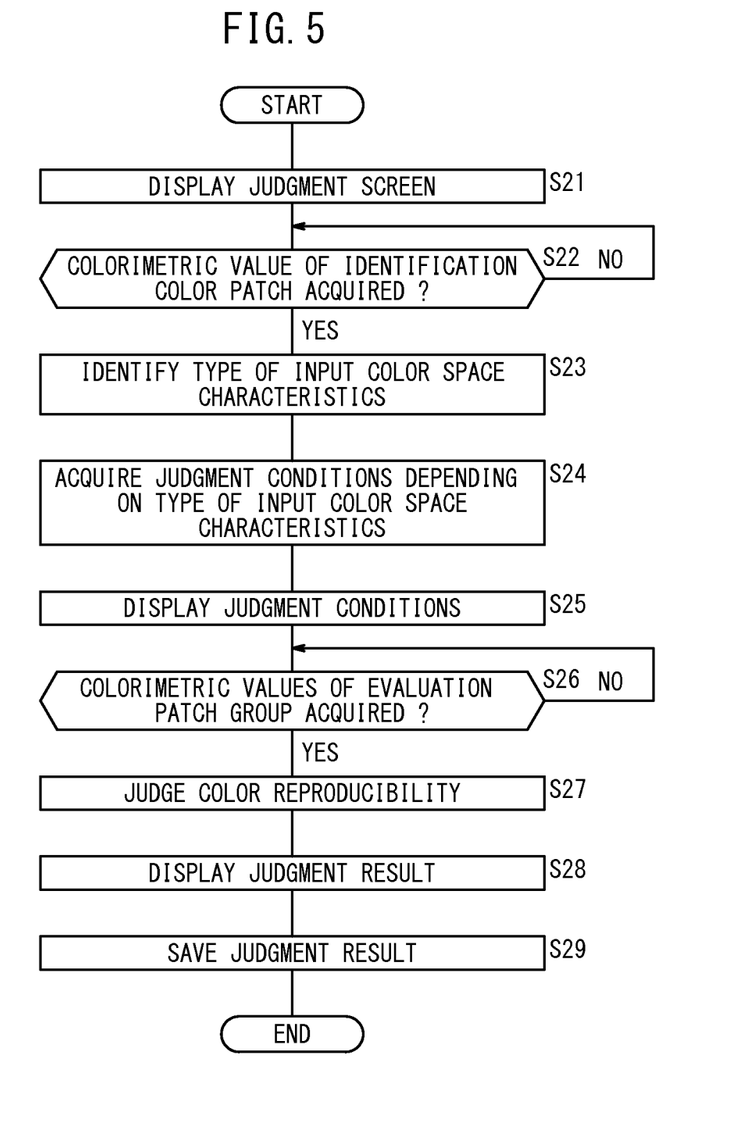
FIG. 5 is a second flowchart of the operation sequence performed by the print color evaluating system shown in FIG. 1.

In step S21 of FIG. 5, the color evaluating apparatus 12 displays a judgment screen 80 (see FIG. 6), which is used to judge color reproducibility of the print 26. More specifically, in response to a command for starting a process for judging color reproducibility, the screen generator 74 generates display data for the judgment screen 80, and then supplies the generated display data to the display controller 46. The display controller 46 controls the display unit 48 in order to display a window W including the judgment screen 80 based on the display data.

Figure 6:
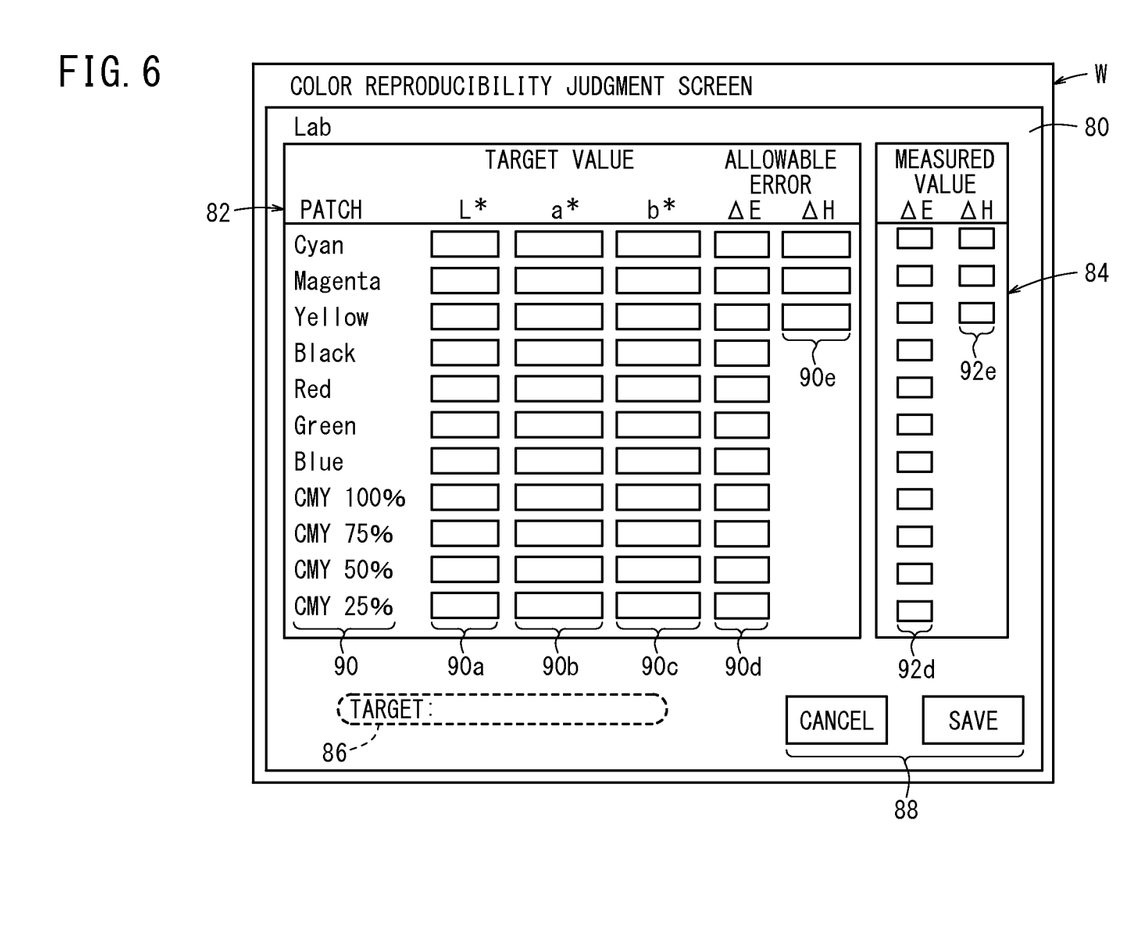
FIG. 6 is a view showing an image that represents a first display pattern on a judgment screen.

As shown in FIG. 6, the judgment screen 80 includes a judgment condition display field 82, a measured value display field 84, a target display field 86, and a button group 88.

The judgment condition display field 82 is a field for displaying judgment conditions 58 for judging colors depending on the type of input color space characteristics. The judgment condition display field 82 includes a character string 90 indicating attributes (names) of the evaluation color patches 34, rectangular frame groups 90a, 90b, 90c indicating target values (L*, a*, b*) for the evaluation color patches 34, and rectangular frame groups 90d, 90e indicating allowable errors (color differences ΔE, hue differences ΔH) for the evaluation color patches 34.

The measured value display field 84 is a field for displaying judgment results obtained from the colorimetric values of the evaluation patch group 30. The measured value display field 84 includes a rectangular frame group 92d indicating color differences ΔE of the evaluation color patches 34, and a rectangular frame group 92e indicating hue differences ΔH of certain ones of the evaluation color patches 34.

The target display field 86 is a field for displaying the type (name) of input color space characteristics.

At the time of step S21 (in an initial state), nothing is displayed in the frame groups 90a through 90e of the judgment condition display field 82, the frame groups 92d, 92e of the measured value display field 84, and the target display field 86.

In step S22, the color evaluating apparatus 12 judges whether or not the colorimetric value of the identification color patch 32 on the print has been acquired. More specifically, after having received the operator's action to take colorimetric measurements, the controller 38 judges whether or not entry of colorimetric data from the colorimeter 22 through the input I/F 44 has been completed. If the controller 38 judges that entry of colorimetric data is not finished (step S22: NO), step S22 is repeated. If the controller 38 judges that entry of colorimetric data is completed (step S22: YES), control proceeds to step S23.

In step S23, the judgment condition acquirer 70 identifies the type of input color space characteristics based on the colorimetric value of the identification color patch 32 acquired in step S22. More specifically, the judgment condition acquirer 70 identifies the type of input color space characteristics that corresponds to the identification color code 54 stored in the memory 52. As described above in connection with step S13, since the identification color patch 32 has a color inherent to the type of input color space characteristics, the judgment condition acquirer 70 can uniquely identify the type of input color space characteristics from the colorimetric value of the identification color patch 32. Thus, the type of input color space characteristics, which was obtained as print information in step S12 (see FIG. 4), can be reproduced.

The actual print 26 includes color reproduction errors therein, which are caused with respect to target values (ideal values). Therefore, the judgment condition acquirer 70 identifies the type of input color space characteristics by selecting a target value, the color difference of which with respect to the colorimetric value is minimum, from among a plurality of target values pre-registered in the identification color code 54. It is preferable to have a sufficient color difference (e.g., a color difference of ΔE>10) between adjacent target values, in view of error factors attributed to the printing apparatus 14 and the colorimeter 22.

In step S24, the judgment condition acquirer 70 acquires judgment conditions 58 for color reproducibility depending on the type identified in step S23. Judgment conditions of various standards (input color space characteristics) differ from each other as a result of different requisite specifications for color reproducibility depending on how the print 26 is used. Examples of such judgment conditions 58 include the number of color patches, target values, allowable errors, the calculation method, and evaluation items.

In step S25, the color evaluating apparatus 12 updates the displayed content of the judgment screen 80 in order to display visible information concerning the judgment conditions 58. More specifically, the screen generator 74 generates display data for the judgment screen 80, and supplies the generated display data to the display controller 46. The display controller 46 controls the display unit 48 in order to display the judgment screen 80 based on the display data.

Figure 7:
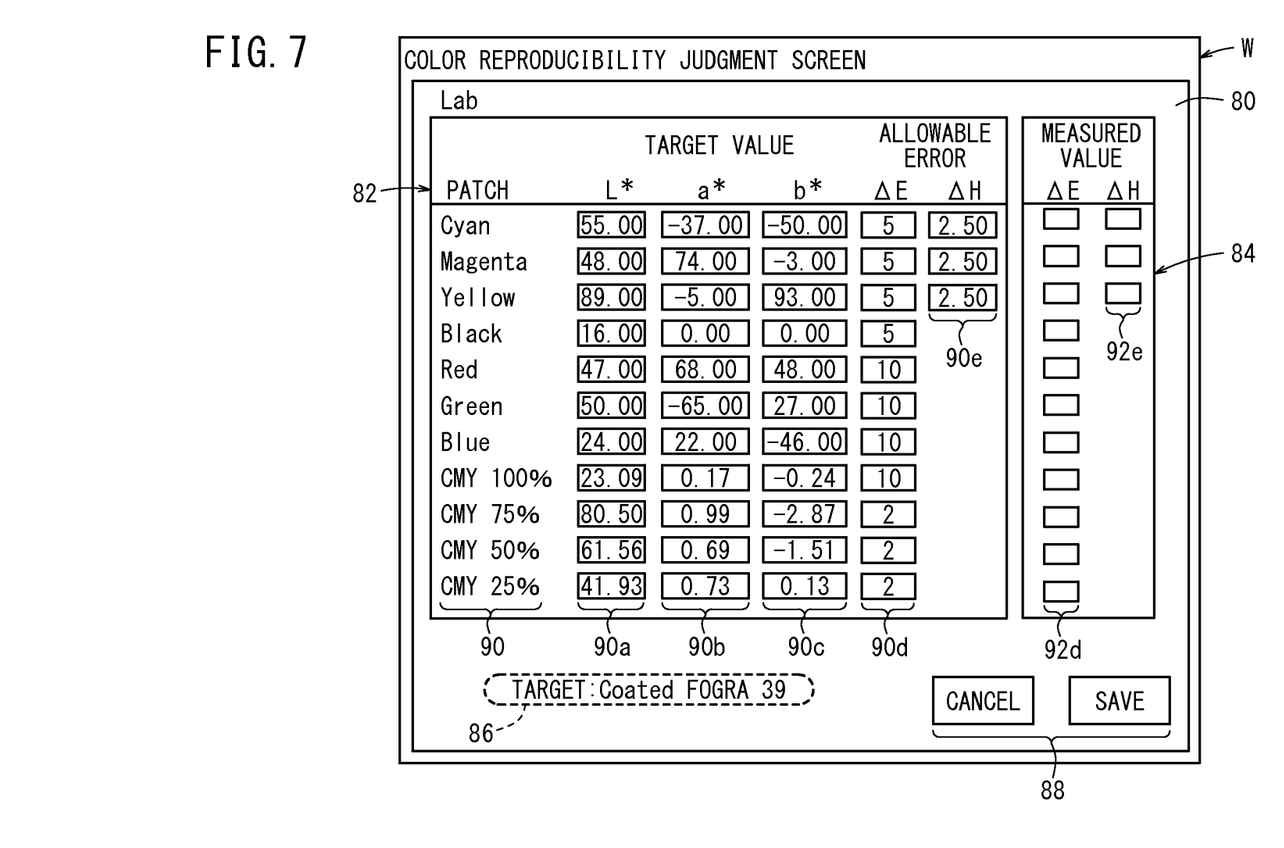
FIG. 7 is a view showing an image that represents a second display pattern on the judgment screen.

As shown in FIG. 7, based on the display data, the display unit 48 (see FIG. 3) displays a new judgment screen 80 in place of the judgment screen 80 shown in FIG. 6. More specifically, the new judgment screen 80 includes a judgment condition display field 82, a measured value display field 84, a target display field 86, and a button group 88, similar to the judgment screen 80 shown in FIG. 6. In addition, the target display field 86 displays the type and name (e.g., "Coated FOGRA 39" in FIG. 7) of the input color space characteristics identified in step S23. The judgment condition display field 82 includes frame groups 90a through 90c, which display, as visible information thereof, certain ones of the judgment conditions 58 acquired in step S24, i.e., target values for the evaluation color patches 34. The judgment condition display field 82 also includes frame groups 90d and 90e, which display certain ones of the judgment conditions 58 acquired in step S24, i.e., allowable errors (color differences ΔE, hue differences ΔH) for the evaluation color patches 34.

The operator visually confirms the target display field 86 or the frame groups 90a through 90e of the judgment condition display field 82 in order to grasp details of the judgment conditions 58. For example, according to standards ISO 12647-7 and ISO 12647-8, all of the target values for the evaluation color patches 34 are in agreement with each other, although certain allowable errors differ slightly from each other. In the case that the judgment conditions 58 based on different standards are confusingly similar in this manner, visual confirmation makes it possible for the operator to reduce the frequency at which erroneous judgments occur.

In step S26, the color evaluating apparatus 12 judges whether or not colorimetric values of the evaluation patch group 30 on the print 26 have been acquired. More specifically, after having received the operator's action to take colorimetric measurements, the controller 38 determines whether or not entry of colorimetric data from the colorimeter 22 through the input I/F 44 has been completed. If the controller 38 determines that entry of colorimetric data is not finished (step S26: NO), step S26 is repeated. If the controller 38 determines that entry of colorimetric data has been completed (step S26: YES), control proceeds to step S27.

In step S27, the judgment section 72 judges the colorimetric values of the evaluation patch group 30 acquired in step S26 according to the judgment conditions 58 acquired in step S24, to thereby produce color reproducibility judgment results. More specifically, if the colorimetric values of the evaluation patch group 30 fall within an allowable range based on the target values, then the colorimetric values are judged as "acceptable". If the colorimetric values of the evaluation patch group 30 fall outside of the allowable range, then the colorimetric values are judged as "unacceptable". In FIG. 7, based on the target values (55, −37, −50), the judgment section 72 judges the color reproducibility of "cyan" as "acceptable" if the color difference ΔE is 5 or smaller and the hue difference ΔH is 2.5 or smaller.

The judgment section 72 may judge whether or not color reproducibility is acceptable for each of the evaluation color patches 34, or may judge whether or not color reproducibility is acceptable, based on a statistic value, e.g., an average value, a maximum value, a minimum value, or a standard deviation, of errors of two or more evaluation color patches 34.

In step S28, the color evaluating apparatus 12 displays the judgment result produced in step S27. More specifically, the display controller 46 controls the display unit 48 in order to display the judgment result, which is made visual in any of various patterns in a window identical to or different from the window W (see FIGS. 6 and 7).

In step S29, the color evaluating apparatus 12 saves the judgment result produced in step S27. More specifically, the controller 38 stores in the memory 52 the color reproducibility judgment result concerning the print 26 in association with the print information (see step S12).

In this manner, the second mode of operation for judging color reproducibility of the print 26 is completed. Thereafter, the color evaluating apparatus 12 sends out various items of information including the colorimetric data and the judgment result, so that the server can save and manage the various data. The judgment result is made accessible from the client apparatus. The print color evaluating system 10 thus acquires color reproducibility, the accuracy of which can be managed easily.

In the print color evaluating system 10 according to the present embodiment, the image processor 20 generates print data including an evaluation patch group, which has at least one evaluation color patch 34, the color of which is determined depending on the type of input color space characteristics used in a color conversion process on data representing the print content 28, and an identification color patch 32 having a color inherent to the type of input color space characteristics. The color evaluating apparatus 12 includes the judgment condition acquirer 70, which identifies the type of input color space characteristics based on the colorimetric value produced by the colorimeter 22 of the identification color patch 32 on the print 26, and acquires judgment conditions 58 for color reproducibility depending on the identified type, and the judgment section 72, which judges the colorimetric values produced by the colorimeter 22 of the evaluation patch group 30 on the print 26, according to the judgment conditions 58 acquired by the judgment condition acquirer 70, for thereby producing the color reproducibility judgment result.

Since the identification color patch 32 is colorimetrically measured by the colorimeter 22 that is used to colorimetrically measure the evaluation patch group 30, the judgment conditions 58 can automatically be acquired based on the obtained colorimetric values depending on the type of input color space characteristics. Thus, the efficiency with which color reproducibility of the print 26 is judged can be increased significantly.

The color evaluating apparatus 12 further includes the display unit 48, which displays visible information concerning the judgment conditions 58 acquired by the judgment condition acquirer 70, depending on colorimetric measurements taken on the identification color patch 32 by the colorimeter 22. Therefore, the user can easily grasp on the display unit 48 the judgment conditions 58 for color reproducibility of the print 26 to be evaluated.

[Modifications]

A print color evaluating system 120 according to a modification of the above embodiment will be described below with reference to FIG. 8. Operations of the print color evaluating system 120 will not be described below, since the print color evaluating system 120 operates according to the operation sequence shown in FIGS. 4 and 5.

Figure 8:
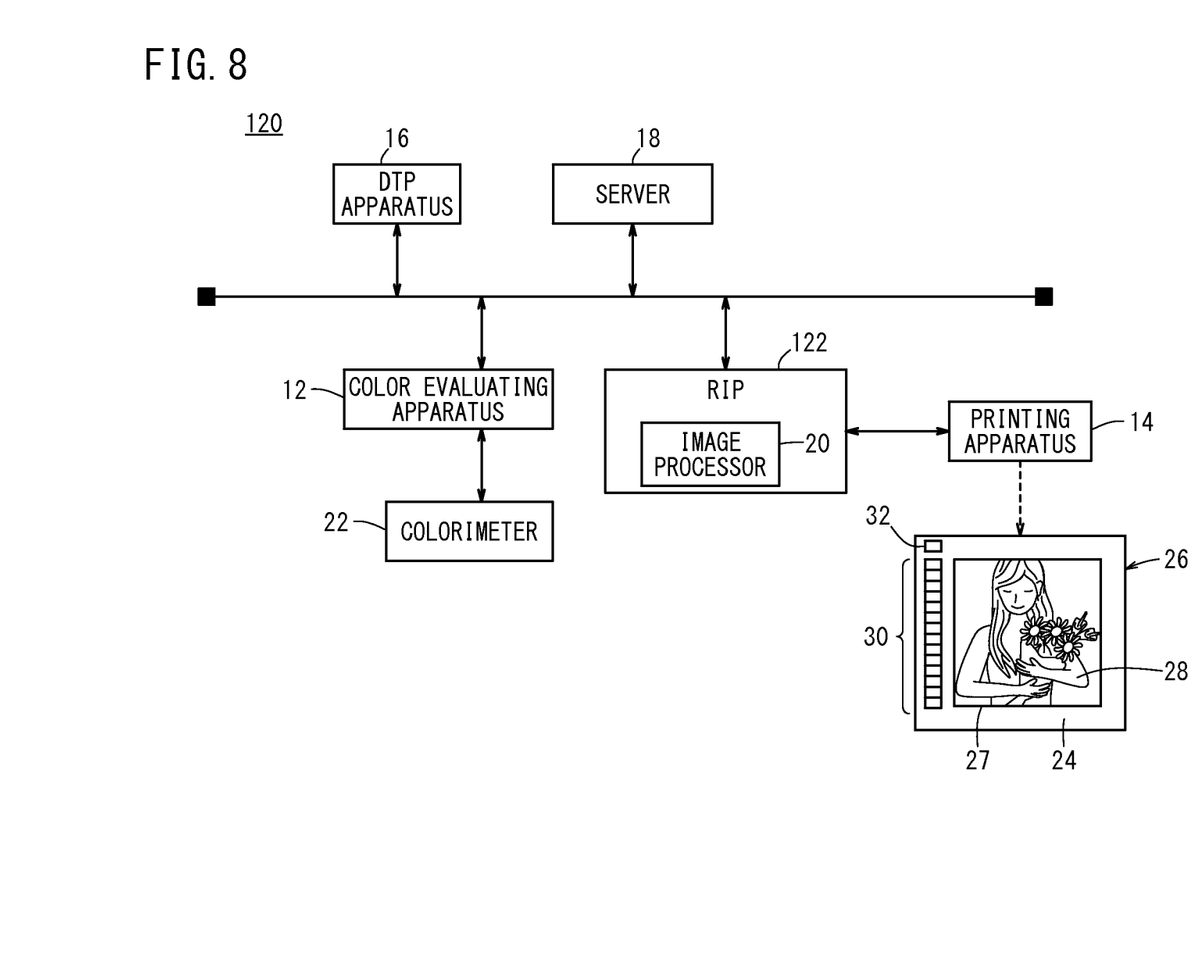
FIG. 8 is a block diagram of a print color evaluating system according to a modification of the embodiment of the present invention.

As shown in FIG. 8, the print color evaluating system 120 includes, in addition to the components shown in FIG. 1, an RIP (Raster Image Processor) 122, which functions as a printing process server for the printing apparatus 14. The RIP 122 includes an image processor 20 that performs the same functions as the image processor 20 shown in FIGS. 1 and 3. The image processor 20 is electrically connected to the printing apparatus 14.

Although the functions of encoding and decoding the type of input color space characteristics based on the identification color patch 32 are performed by another apparatus, the print color evaluating system 120 offers the same advantages as the print color evaluating system 10 according to the above-described embodiment. It is noted that the same data must be used for the identification color code 54 and the judgment conditions 58.

Although a certain preferred embodiment of the present invention has been shown and described in detail, it should be understood that various changes and modifications may be made to the embodiment without departing from the scope of the invention as set forth in the appended claims.

What is claimed is:

1. A print color evaluating system comprising:
   an image processor that generates print data including at least one item of print content;
   a printing apparatus that produces a print based on the print data supplied from the image processor;
   a colorimeter that colorimetrically measures the print produced by the printing apparatus; and
   a color evaluating apparatus that evaluates color reproducibility of the print based on colorimetric values of the print produced by the colorimeter;
   wherein the image processor generates the print data so as to include:
      an evaluation patch group, which has at least one evaluation color patch, wherein said at least one evaluation color patch has a color that was determined depending on a type of input color space characteristics used in a color conversion process on content data representing the print content, and
      an identification color patch that has a color that is inherent to the type of input color space characteristics; and
   wherein the color evaluating apparatus comprises:
      a judgment condition acquirer, which identifies the type of input color space characteristics based on a colorimetric value produced by the colorimeter of the identification color patch on the print, and acquires judgment conditions for the color reproducibility depending on the type of input color space characteristics; and
      a judgment section that judges the colorimetric values of the evaluation patch group on the print, the colorimetric values being produced by the colorimeter, according to the judgment conditions acquired by the judgment condition acquirer, to thereby produce a color reproducibility judgment result.

2. The print color evaluating system according to claim 1, wherein the color evaluating apparatus further comprises:
   a display unit that displays visible information concerning the judgment conditions acquired by the judgment condition acquirer, depending on colorimetric measurements taken on the identification color patch by the colorimeter.

3. The print color evaluating system according to claim 2, wherein the color evaluating apparatus displays as the visible information on the display unit target values and allowable errors for respective evaluation color patches.

4. The print color evaluating system according to claim 2, wherein the color evaluating apparatus displays on the display unit a name of the input color space characteristics, the type of which has been identified.

5. A print color evaluating method carried out using an image processor that generates print data including at least one item of print content, a printing apparatus that produces a print based on the print data supplied from the image processor, a colorimeter that colorimetrically measures the print produced by the printing apparatus, and a color evaluating apparatus that evaluates color reproducibility of the print based on colorimetric values of the print produced by the colorimeter, the print color evaluating method comprising the steps of:
   the image processor generating the print data including:
      an evaluation patch group, which has at least one evaluation color patch, wherein said at least one evaluation color patch has a color that was determined depending on a type of input color space characteristics used in a color conversion process on content data representing the print content, and
      an identification color patch that has a color that is inherent to the type of input color space characteristics;
   the color evaluating apparatus identifying the type of input color space characteristics based on a colorimetric value produced by the colorimeter of the identification color patch on the print, and acquiring judgment conditions for the color reproducibility depending on the type of input color space characteristics; and
   the color evaluating apparatus judging the colorimetric values of the evaluation patch group on the print, the colorimetric values being produced by the colorimeter, according to the acquired judgment conditions, to thereby produce a color reproducibility judgment result.

6. The print color evaluating method according to claim 5, further comprising the step of:
   displaying visible information concerning the acquired judgment conditions, depending on colorimetric measurements taken on the identification color patch by the colorimeter.

7. The print color evaluating method according to claim 6, wherein the step of displaying comprises the step of displaying, as the visible information, target values and allowable errors for respective evaluation color patches.

8. The print color evaluating method according to claim 6, wherein the step of displaying comprises the step of displaying a name of the input color space characteristics, the type of which has been identified.

9. A non-transitory storage medium storing a program for evaluating color reproducibility of a print including at least one item of print content, based on colorimetric values produced by colorimetrically measuring the print, the program enabling a computer to perform the steps of:
   generating a print data including:
      an evaluation patch group, which has at least one evaluation color patch, wherein said at least one evaluation color patch has a color that was determined depending on a type of input color space characteristics used in a color conversion process on content data representing the print content, and
      an identification color patch that has a color that is inherent to the type of input color space characteristics;
   identifying the type of input color space characteristics based on a colorimetric value produced by the colorimeter of the identification color patch on the print, and acquiring judgment conditions for the color reproducibility depending on the type of input color space characteristics; and judging the colorimetric values of the evaluation patch group on the print, the colorimetric values being produced by the colorimeter, according to the acquired judgment conditions, to thereby produce a color reproducibility judgment result.

* * * * *